United States Patent
Paterson

(10) Patent No.: US 12,453,637 B2
(45) Date of Patent: Oct. 28, 2025

(54) CONVERTIBLE ORTHOPAEDIC IMPLANT SYSTEMS AND METHODS

(71) Applicant: Arthrex, Inc., Naples, FL (US)

(72) Inventor: John D. Paterson, Naples, FL (US)

(73) Assignee: ARTHREX, INC., Naples, FL (US)

( * ) Notice: Subject to any disclaimer, the term of this patent is extended or adjusted under 35 U.S.C. 154(b) by 925 days.

(21) Appl. No.: 17/494,965

(22) Filed: Oct. 6, 2021

(65) Prior Publication Data

US 2022/0110757 A1 Apr. 14, 2022

Related U.S. Application Data

(60) Provisional application No. 63/089,878, filed on Oct. 9, 2020.

(51) Int. Cl.
 A61F 2/40 (2006.01)
 A61F 2/30 (2006.01)

(52) U.S. Cl.
CPC ... *A61F 2/4081* (2013.01); *A61F 2002/30113* (2013.01); *A61F 2002/30649* (2013.01); *A61F 2002/4022* (2013.01); *A61F 2002/4085* (2013.01)

(58) Field of Classification Search
CPC ... A61F 2/40; A61F 2/4081; A61F 2002/4085
See application file for complete search history.

(56) References Cited

U.S. PATENT DOCUMENTS

| | | | |
|---|---|---|---|
| 7,819,925 B2 | 10/2010 | King et al. | |
| 7,931,690 B1 | 4/2011 | Bonutti | |
| 8,147,558 B2 | 4/2012 | Lee et al. | |
| 8,303,665 B2 * | 11/2012 | Tornier | A61F 2/30734 623/19.11 |
| 8,632,597 B2 | 1/2014 | Lappin | |
| 8,764,836 B2 | 7/2014 | De Wilde et al. | |
| 8,852,283 B2 | 10/2014 | Tornier et al. | |
| 8,870,962 B2 | 10/2014 | Roche et al. | |
| 8,940,054 B2 | 1/2015 | Wiley et al. | |
| 9,066,806 B2 | 6/2015 | Phipps | |
| 9,114,017 B2 | 8/2015 | Lappin | |
| 9,226,830 B2 | 1/2016 | De Wilde et al. | |
| 9,233,003 B2 | 1/2016 | Rouche et al. | |

(Continued)

FOREIGN PATENT DOCUMENTS

| | | |
|---|---|---|
| EP | 2724691 | 4/2014 |
| EP | 3498227 | 6/2019 |

(Continued)

OTHER PUBLICATIONS

International Preliminary Report on Patentability for International Application No. PCT/US2021/053692 mailed Apr. 20, 2023.

(Continued)

*Primary Examiner* — Brian A Dukert

(74) *Attorney, Agent, or Firm* — Carlson, Gaskey & Olds, P.C.

(57) ABSTRACT

This disclosure relates to orthopaedic implant systems and methods for restoring functionality to a joint. The implant systems disclosed herein include offset arrangements that may facilitate conversion of the implant system during a subsequent surgical procedure.

35 Claims, 9 Drawing Sheets

(56) References Cited

U.S. PATENT DOCUMENTS

| | | |
|---|---|---|
| 9,283,083 B2 | 3/2016 | Winslow et al. |
| 9,452,055 B2 | 9/2016 | Lappin |
| 9,532,880 B2 | 1/2017 | Lappin |
| 9,545,311 B2 | 1/2017 | Courtney, Jr. et al. |
| 9,545,312 B2 | 1/2017 | Tornier et al. |
| 9,629,725 B2 | 4/2017 | Gargac et al. |
| 9,668,873 B2* | 6/2017 | Winslow ............... A61F 2/4081 |
| 9,844,440 B2 | 12/2017 | Kovacs et al. |
| 10,034,757 B2 | 7/2018 | Kovacs et al. |
| 10,258,478 B2 | 4/2019 | Kovacs et al. |
| 10,265,184 B2 | 4/2019 | Lappin |
| 10,357,373 B2 | 7/2019 | Gargac et al. |
| 10,383,735 B2 | 8/2019 | Wiley et al. |
| 10,517,736 B2 | 12/2019 | Lappin et al. |
| 10,555,816 B1 | 2/2020 | Pappou |
| 10,722,374 B2 | 7/2020 | Hodorek et al. |
| 11,065,125 B2 | 7/2021 | Ball |
| 2004/0220674 A1 | 11/2004 | Pria |
| 2005/0261775 A1 | 11/2005 | Baum et al. |
| 2005/0278030 A1 | 12/2005 | Tornier et al. |
| 2006/0200248 A1 | 9/2006 | Beguin et al. |
| 2012/0221111 A1 | 8/2012 | Burkhead, Jr. et al. |
| 2014/0025173 A1 | 1/2014 | Cardon et al. |
| 2016/0324649 A1 | 11/2016 | Hodorek et al. |
| 2017/0095336 A1 | 4/2017 | Tornier et al. |
| 2018/0085226 A1 | 3/2018 | Baumgarten |
| 2018/0303618 A1 | 10/2018 | Kovacs et al. |
| 2018/0333268 A1 | 11/2018 | Cardon et al. |
| 2019/0015116 A1 | 1/2019 | Gargac et al. |
| 2019/0015117 A1 | 1/2019 | Neichel et al. |
| 2019/0015118 A1 | 1/2019 | Neichel et al. |
| 2019/0015221 A1 | 1/2019 | Neichel et al. |
| 2019/0151106 A1 | 5/2019 | Kovacs et al. |
| 2019/0159907 A1 | 5/2019 | Roche et al. |
| 2019/0192305 A1 | 6/2019 | Frankle et al. |
| 2019/0240035 A1 | 8/2019 | Lappin |
| 2019/0298537 A1 | 10/2019 | Gargac et al. |
| 2019/0343643 A1 | 11/2019 | Cardon et al. |
| 2019/0358045 A1 | 11/2019 | Boileau et al. |
| 2020/0030108 A1 | 1/2020 | Orphanos et al. |
| 2020/0113632 A1 | 4/2020 | Varadarajan et al. |
| 2020/0179126 A1 | 6/2020 | Courtney, Jr. et al. |
| 2020/0188121 A1 | 6/2020 | Boux de Casson et al. |
| 2020/0229931 A1 | 7/2020 | Tornier et al. |

FOREIGN PATENT DOCUMENTS

| | | |
|---|---|---|
| WO | 2017165346 | 9/2017 |
| WO | 2018052965 | 3/2018 |
| WO | 2018081073 | 5/2018 |
| WO | 2018136393 | 7/2018 |
| WO | 2018211098 | 11/2018 |

OTHER PUBLICATIONS

International Search Report for Written Opinion for International Application No. PCT/US2021/053692 completed Jan. 17, 2022.

Musculoskeletal Key. Arthrex Univers Revers (TM) shoulder prosthesis. Retrieved from: https://musculoskeletalkey.com/arthrex-univers-revers-shoulder-prosthesis/.

Exactech. Equinoxe System Main Brochure. Equinoxe strength in numbers. Retrieved from: https://www.exac.com/wp-content/uploads/2021/06/12-0000039_Equinoxe_Main_Brochure_Web.pdf.

Exactech. Euinoxe Plaftform System. Retrieved Aug. 4, 2020 from: https://www.exac.com/extremities/equinoxe-platform-system/.

Notice of Reasons for Rejection for Japanese Patent Application No. 2023-521636 mailed Jul. 29, 2025.

* cited by examiner

CONVERTIBLE ORTHOPAEDIC IMPLANT SYSTEMS AND METHODS

CROSS-REFERENCE TO RELATED APPLICATION

The present disclosure claims the benefit of U.S. Provisional Patent Application No. 63/089,878, filed Oct. 9, 2020.

BACKGROUND

This disclosure relates to orthopaedic procedures and, more particularly, to orthopaedic implant systems and methods for repairing bone defects and restoring functionality to a joint.

Many bones of the human musculoskeletal system include articular surfaces. The articular surfaces cooperate to facilitate different types and degrees of joint movement. The articular surfaces can erode or experience bone loss over time due to repeated use or wear or can fracture as a result of a traumatic impact. These types of bone defects can cause joint instability and pain.

Bone deficiencies may occur along the articular surfaces of the glenoid bone. Some techniques utilize an implant to repair the articular surfaces. The implant may be secured to the glenoid utilizing one or more fasteners.

SUMMARY

This disclosure relates to orthopaedic implant systems and methods for restoring functionality to a joint. The implant systems may be convertible between a first configuration and a second configuration during different surgical procedures along the same surgical site.

An implant for an anatomical shoulder replacement of the present disclosure may include a baseplate configured to be embedded in or on a glenoid, and a pad configured to interface with a humerus or humeral implant. The pad may be configured to extend superiorly beyond the baseplate relative to a superior-inferior direction of the glenoid.

A convertible orthopaedic implant system for a shoulder replacement that interfaces with an opposed articular surface associated with a humerus of the present disclosure may include a baseplate including a plate body that may be configured to be at least partially embedded in or on a glenoid, the plate body extending in a thickness direction between a front face and a rear face, a pad including a pad body extending in the thickness direction between an articulating face and a bone contacting face, the pad body extending a first length in a lengthwise direction between opposed sides of a peripheral wall that establishes a perimeter of the pad body, and the articulating face dimensioned to interface with the opposed articular surface associated with the humerus. The baseplate may be releasable secured to the pad adjacent the bone contacting face. A perimeter of the plate body projected onto a reference plane may define a first plate area associated with a first centroid, the perimeter of the pad body projected onto the reference plane may define a second plate area associated with a second centroid, and the pad body may be dimensioned such that the second centroid is offset by a first distance from the first centroid relative to the lengthwise direction.

A method of installing a convertible orthopaedic implant system that interfaces with an opposed articular surface associated with a humerus of the present disclosure may include positioning a baseplate relative to a glenoid face of a glenoid, the baseplate including a plate body extending in a thickness direction between a front face and a rear face, and the baseplate including one or more plate apertures, positioning at least one fastener in a respective one of the plate apertures to secure the baseplate to the glenoid, releasably securing a pad to the baseplate, the pad including a pad body extending in the thickness direction between an articulating face and a bone contacting face, the pad body extending a first length between opposed sides of a peripheral wall that establishes a perimeter of the pad body, the articulating face may be dimensioned to interface with the opposed articular surface associated with the humerus, and the bone contacting face may contact bone along the glenoid. The plate body may define a first center of mass, the pad body may define a second center of mass, and the pad body may be dimensioned such that the second center of mass is superiorly offset from the first center of mass by a first distance relative to a superior-inferior direction of the glenoid in response to the step of securing the pad.

A method of installing a convertible orthopaedic implant system that interfaces with an opposed articular surface associated with a humerus of the present disclosure may include removing a pad from a baseplate at a first position relative to a glenoid, the baseplate including a plate body extending in a thickness direction between a front face and a rear face, and the pad including a pad body extending in the thickness direction between an articulating face and a bone contacting face. The plate body may define a first center of mass, the pad body may define a second center of mass, and the pad body may be dimensioned such that the second center of mass is superiorly offset from the first center of mass by a first distance relative to the superior-inferior direction in the first position. The method may include securing a glenosphere to the baseplate in situ subsequent to the step of removing the pad, and the glenosphere may include an articulating surface having a generally convex geometry dimensioned to interface with a humeral implant.

DETAILED DESCRIPTION

Figure 1:
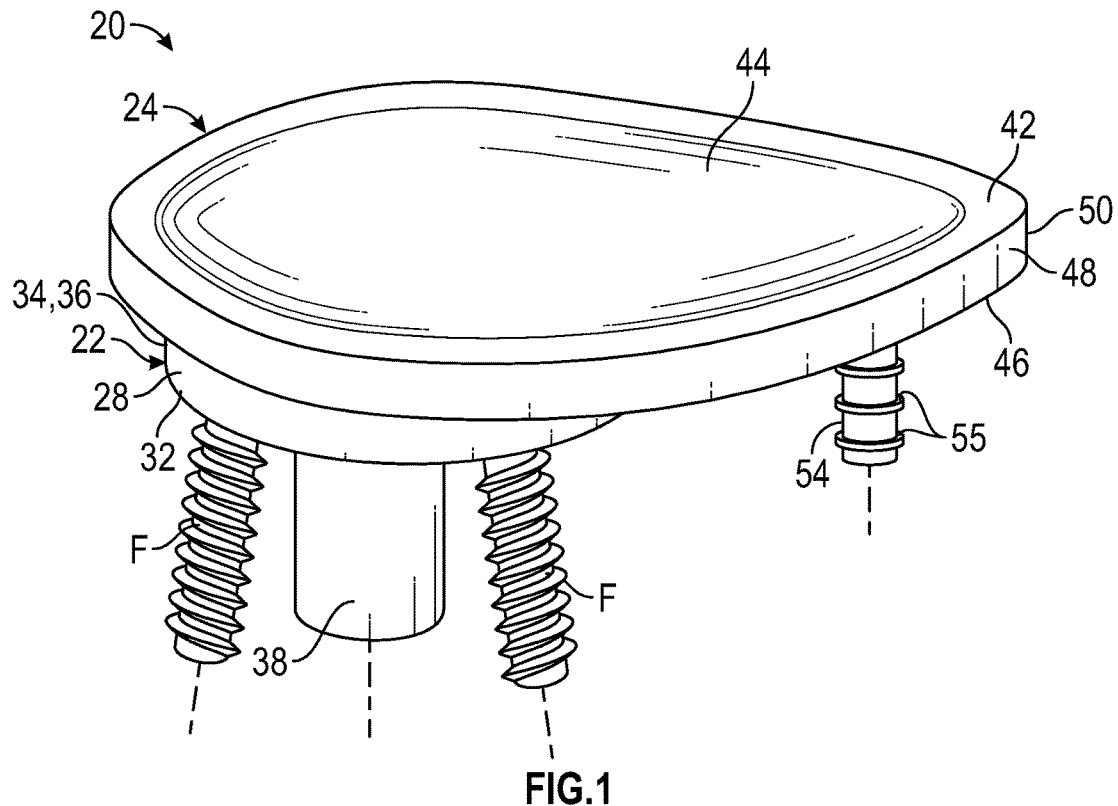
FIG. 1 illustrates a perspective view of an exemplary implant system including a baseplate and pad in a first configuration.

This disclosure relates to orthopaedic implant systems and methods for repairing bone defects and restoring functionality. The implant systems described herein may be utilized during arthroplasty procedures and incorporated into a shoulder prosthesis for restoring functionality to shoulders having advanced cartilage disease. The disclosed implant systems may be utilized in anatomical and reverse shoulder procedures for the same patient utilizing one or more common components, which can lead to improved healing. The various components may be offset from each other, such as relative to the Superior/Inferior (S/I) direction of a glenoid face, to facilitate a subsequent procedure.

An implant for an anatomical shoulder replacement according to an exemplary aspect of the present disclosure may include a baseplate configured to be embedded in or on a glenoid, and a pad configured to interface with a humerus or humeral implant. A center of the pad may be configured to extend superiorly beyond a center of the baseplate relative to a superior-inferior direction of the glenoid.

In some embodiments, the baseplate is circular.

In some embodiments, the pad is oblong.

In some embodiments, at least 25% of an area of the pad and/or a length of the pad extends superior to the baseplate relative to the superior-inferior direction.

In some embodiments, a center of mass of the base plate is offset inferiorly to a center of mass of the pad.

In some embodiments, a glenosphere is releasably secured to the baseplate.

In some embodiments, a spacer is dimensioned to establish a lateral offset and/or angular offset of the glenosphere relative to the baseplate.

A convertible orthopaedic implant system for a shoulder replacement that interfaces with an opposed articular surface associated with a humerus according to an exemplary aspect of the present disclosure may include a baseplate including a plate body that may be configured to be at least partially embedded in or on a glenoid, the plate body extending in a thickness direction between a front face and a rear face, a pad including a pad body extending in the thickness direction between an articulating face and a bone contacting face, the pad body extending a first length in a lengthwise direction between opposed sides of a peripheral wall that establishes a perimeter of the pad body, and the articulating face dimensioned to interface with the opposed articular surface associated with the humerus. The baseplate may be releasable secured to the pad adjacent the bone contacting face. A perimeter of the plate body projected onto a reference plane may define a first plate area associated with a first centroid, the perimeter of the pad body projected onto the reference plane may define a second plate area associated with a second centroid, and the pad body may be dimensioned such that the second centroid is offset by a first distance from the first centroid relative to the lengthwise direction.

In some embodiments, the perimeter of the plate body may be substantially circular, and the perimeter of the pad body may be oblong.

In some embodiments, the pad may have a monolithic construction and may comprise a non-metallic material, and the plate body may comprise a metallic material.

In some embodiments, an offset ratio of the first distance divided by the first length may be at least 1:4 such that the second centroid is superiorly offset from the first centroid relative to a superior-inferior direction of the glenoid. An area ratio of the pad area divided by the plate area may be greater than or equal to 1.5:1. A ratio of a maximum width across the perimeter of the plate body to a minimum width across the perimeter of the pad body may be equal to or greater than 0.5:1.

In some embodiments, the plate body may include a plurality of peripheral apertures configured to receive respective fasteners to secure the baseplate to bone. The baseplate may include an anchoring stem extending outwardly from the rear face of the plate body along a stem axis, and the anchoring stem may be configured to be at least partially inserted in a bone hole to secure the baseplate.

In some embodiments, the first centroid of the plate body may be substantially aligned with a projection of the stem axis.

In some embodiments, the peripheral apertures may be circumferentially distributed about a central aperture in the plate body, and the central aperture may extend along a projection of the stem axis. The pad may include first and second pegs extending outwardly from the bone contacting face, the first peg may be configured to be received in the central aperture and the second peg may be configured to be received in a respective one of the peripheral apertures to limit relative rotation between the plate body and the pad body with respect to the stem axis.

In some embodiments, a glenosphere may include an articulating surface having a generally convex geometry, and the glenosphere may be releasably secured to the baseplate.

In some embodiments, the glenosphere may include a recess dimensioned to at least partially receive the plate body.

In some embodiments, the perimeter of the plate body may be dimensioned to cooperate with a perimeter of the recess to establish a Morse taper connection that limits relative movement between the baseplate and the glenosphere.

In some embodiments, a spacer may be configured to interface with the plate body and the glenosphere such that the glenosphere is spaced apart from the plate body by a predetermined distance.

In some embodiments, the spacer may be dimensioned such that a rear face of the glenosphere is transversely angled relative to the front face of the plate body.

In some embodiments, the plate body may include a plurality of plate apertures. The spacer may include one or more pegs configured for insertion into respective ones of the plate apertures. The spacer may include one or more spacer apertures that substantially align with respective ones of the plate apertures such that respective fasteners are insertable through each respective pair of the plate and spacer apertures and into the glenoid to secure the baseplate.

A method of installing a convertible orthopaedic implant system that interfaces with an opposed articular surface associated with a humerus according to an exemplary aspect of the present disclosure may include positioning a baseplate relative to a glenoid face of a glenoid, the baseplate including a plate body extending in a thickness direction between a front face and a rear face, and the baseplate including one or more plate apertures, positioning at least one fastener in a respective one of the plate apertures to secure the baseplate to the glenoid, releasably securing a pad to the baseplate, the pad including a pad body extending in the thickness direction between an articulating face and a bone contacting face, the pad body extending a first length between opposed sides of a peripheral wall that establishes a perimeter of the pad body, the articulating face may be dimensioned to interface with the opposed articular surface associated with the humerus, and the bone contacting face may contact bone along the glenoid. The plate body may define a first center of mass, the pad body may define a second center of mass, and the pad body may be dimensioned such that the second center of mass is superiorly offset from the first center of mass by a first distance relative to a superior-inferior direction of the glenoid in response to the step of securing the pad.

In some embodiments, an anchoring stem may extend outwardly from the rear face of the plate body along a stem axis. The step of positioning the baseplate may include forming a recess in the glenoid, positioning at least a portion of the plate body in the recess, and positioning the anchoring stem at least partially in a bone hole that extends inwardly from the recess. The step of securing the pad may include positioning the pad body such that the bone contacting face follows a contour of the glenoid face.

In some embodiments, the step of securing the pad may occur such that an offset ratio of the first distance divided by the first length is at least 1:4. A perimeter of the plate body projected onto a reference plane may define a first plate area, the perimeter of the pad body projected onto the reference plane may define a second plate area, and an area ratio of the pad area divided by the plate area may be greater than or equal to 1.5:1.

In some embodiments, the step of securing the pad may occur such that at least 25% of the pad area and at least 25% of the first length of the pad body are superiorly offset from the first center of mass of the plate body relative to the superior-inferior direction.

In some embodiments, the area ratio may be between 2:1 and 3:1. The glenoid face may be divided into three equal regions including a superior region, an intermediate region and an inferior region relative to the superior-inferior direction, the intermediate region between the superior and inferior regions. The step of positioning the baseplate may occur such that the first center of mass of the plate body is situated in the inferior region. The step of securing the pad may occur such that the second center of mass of the pad body is situated in the intermediate region.

In some embodiments, an anchoring stem may extend outwardly from the rear face of the plate body along a stem axis, and the first center of mass of the plate body is substantially aligned with a projection of the stem axis. The step of positioning the baseplate may include forming a recess in the glenoid, positioning at least a portion of the plate body in the recess, and positioning the anchoring stem at least partially in a bone hole that extends inwardly from the recess such that the stem axis is positioned in the inferior region. The step of securing the pad may include positioning the pad body such that the bone contacting face follows a contour of the glenoid face.

In some embodiments, the method may include removing the pad from the baseplate subsequent to the step of securing the pad, and securing a glenosphere to the baseplate in situ subsequent to the step of removing the pad. The glenosphere may include an articulating surface having a generally convex geometry dimensioned to interface with a humeral implant.

In some embodiments, the method may include securing a spacer between the baseplate and the glenosphere such that the glenosphere is laterally spaced apart from the plate body by a predetermined distance relative to a lateral-medial direction of the glenoid.

In some embodiments, the spacer may be dimensioned such that a rear face of the glenosphere is transversely angled relative to the front face of the plate body in response to the step of securing the spacer.

A method of installing a convertible orthopaedic implant system that interfaces with an opposed articular surface associated with a humerus according to an exemplary aspect of the present disclosure may include removing a pad from a baseplate at a first position relative to a glenoid, the baseplate including a plate body extending in a thickness direction between a front face and a rear face, and the pad including a pad body extending in the thickness direction between an articulating face and a bone contacting face. The plate body may define a first center of mass, the pad body may define a second center of mass, and the pad body may be dimensioned such that the second center of mass is superiorly offset from the first center of mass by a first distance relative to the superior-inferior direction in the first position. The method may include securing a glenosphere to the baseplate in situ subsequent to the step of removing the pad, and the glenosphere may include an articulating surface having a generally convex geometry dimensioned to interface with a humeral implant.

In some embodiments, the method may include securing a spacer between the baseplate and the glenosphere such that the glenosphere is laterally spaced apart from the plate body by a predetermined distance relative to a lateral-medial direction of the glenoid.

In some embodiments, the spacer may be dimensioned such that a rear face of the glenosphere is transversely angled relative to the front face of the plate body in response to the step of securing the spacer.

Figure 2:
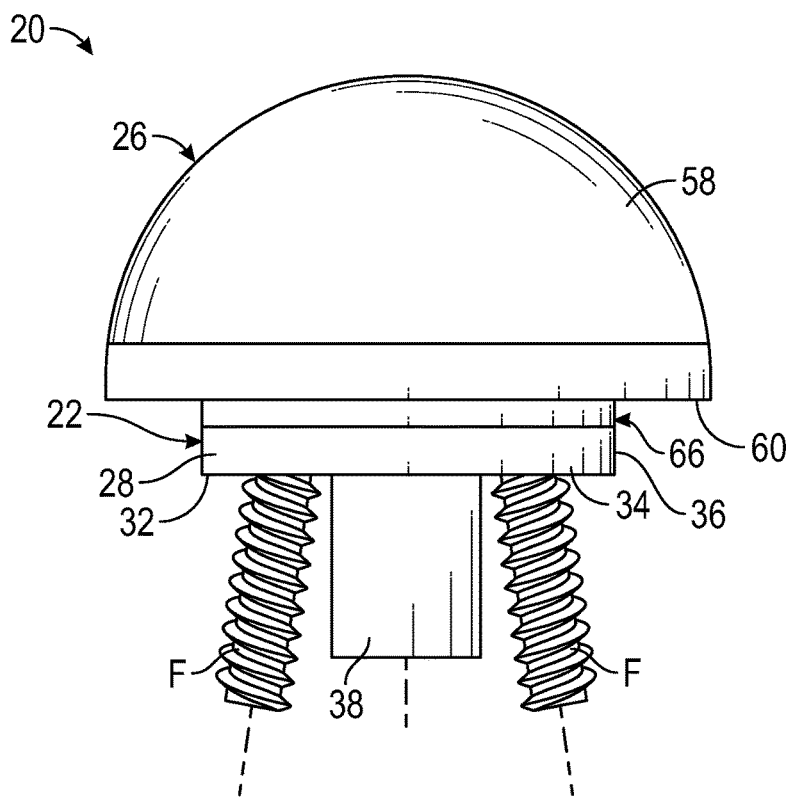
FIG. 2 illustrates a perspective view of implant system including the baseplate and a glenosphere in a second configuration.

FIGS. 1 and 2 illustrate an exemplary convertible orthopedic implant system 20. The system 20 can be utilized for various surgical procedures, such as an arthroplasty for restoring functionality of a joint. For example, the system 20 may be incorporated into a shoulder prosthesis and may be utilized to repair articular surfaces along a glenoid in a shoulder replacement procedure. The implant system 20 may be convertible and may be utilized in both anatomical and reverse shoulder replacement procedures for the same patient. Although the systems and methods disclosed herein primarily refer to anatomical and reverse shoulder reconstructions, the disclosed systems may be utilized to restore functionality to other locations of the patient, such as knee and hip joints.

The implant system 20 is convertible between a first configuration and a second configuration. The first configuration may correspond to an anatomical shoulder replacement procedure or arrangement, and the second configuration may correspond to a reverse shoulder replacement procedure or arrangement, or vice versa. For example, a configuration of the system 20 in FIG. 1 may correspond to the first configuration, and a configuration of the system 20 in FIG. 2 may correspond to the second configuration.

Referring to FIGS. 1 and 2, the system 20 includes a baseplate 22, pad 24 (e.g., bearing member) and glenosphere 26. The pad 24 is releasably secured to the baseplate 22 to establish a first implant, as illustrated in FIG. 1. The glenosphere 26 is releasably secured to the baseplate 22 to establish a second, different implant, as illustrated in FIG. 2. The baseplate 22 may be a common to both the pad 24 and glenosphere 26. The common baseplate 22 may be positioned along a surgical site during a first surgical procedure and may remain in the same position along the surgical site during a second, subsequent surgical procedure, which may improve healing.

Figure 3:
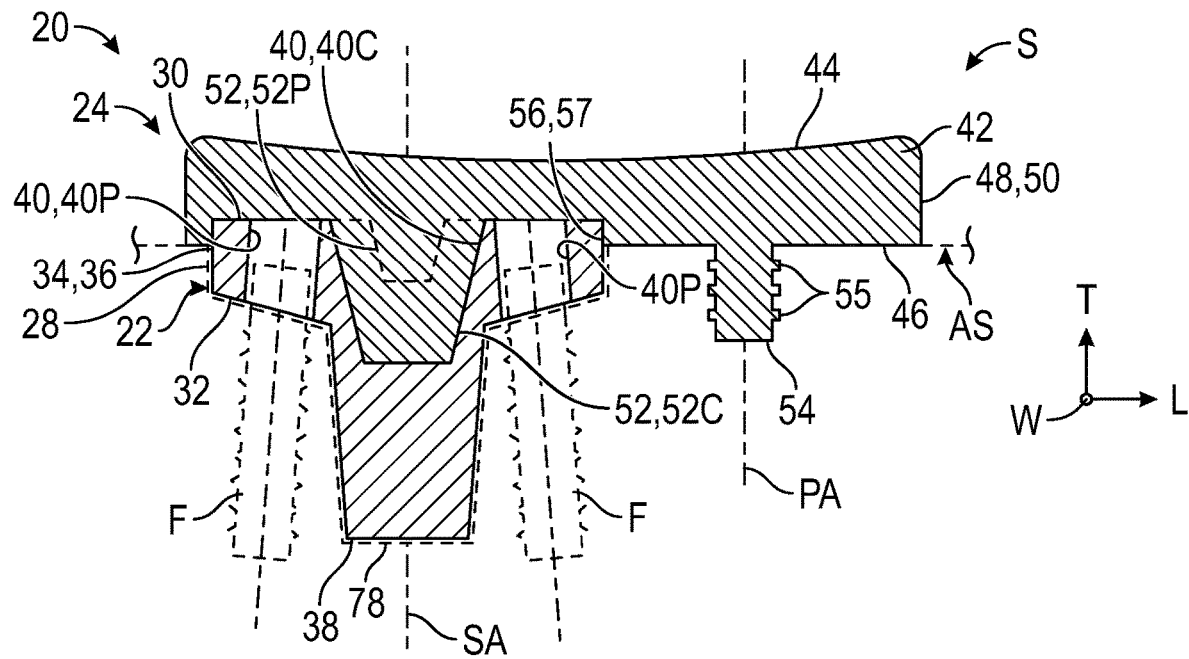
FIG. 3 illustrates a sectional view of the implant system of FIG. 1.

Referring to FIG. 3, with continuing reference to FIG. 1, the baseplate 22 includes a plate body 28 configured to mount the pad 24. The plate body 28 can be configured to be at least partially embedded on or in a recess formed in an articular surface AS of a surgical site S (shown in dashed lines in FIG. 3 for illustrative purposes), or the plate body 28 may be configured to sit on the articular surface AS. In some implementations, the surgical site S may be a glenoid or another articulating joint of a patient.

The plate body 28 extends in a thickness direction T between a front face 30 and a rear face 32 opposed to the front face 30. The rear face 32 can be configured to contact bone in an installed position. The rear face 32 may generally correspond to a medial side of a patient, and the front face 30 may generally correspond to a lateral side of the patient when implanted in the surgical site, for example. In some implementations, the plate body 28 has a thickness of between about 2.0 millimeters (mm) and about 6.0 mm, such as about 4.5 mm.

Figure 4:
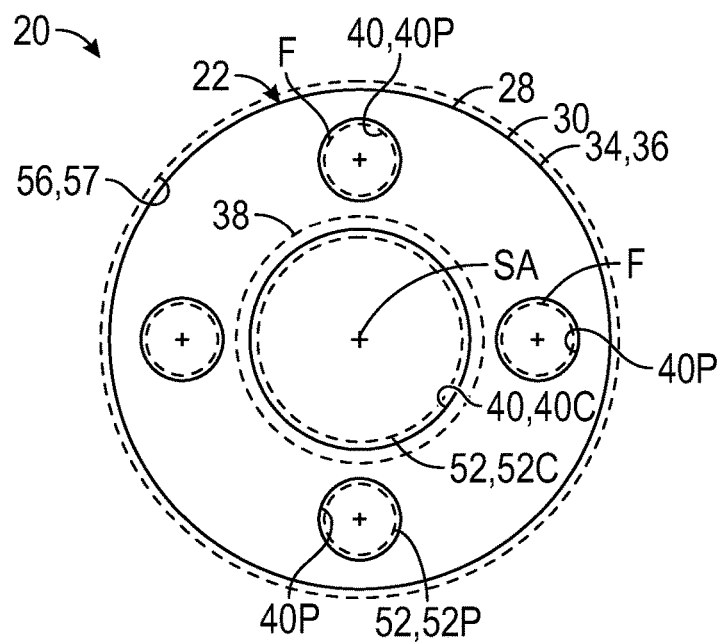
FIG. 4 illustrates a plan view of selected portions of the implant system of FIG. 3.

A peripheral wall 34 extends in the thickness direction T between the front face 30 and rear face 32 to establish a plate perimeter 36 of the plate body 28. The plate perimeter 36 is dimensioned to encircle the front face 30 and rear face 32. The plate perimeter 36 can have various geometries. In some implementations, the plate perimeter 36 has a substantially circular or elliptical geometry, as illustrated in FIG. 4. For the purposes of this disclosure, the terms "about," "approximately" and "substantially" mean ±5% of the stated value or relationship unless otherwise indicated. A substantially circular geometry may reduce a reaming width and complexity of preparing a surgical site to accept the baseplate 22.

The baseplate 22 may include at least one protrusion 38 (e.g. post or keel) configured to be embedded in bone to secure the baseplate 22. The protrusion 38 may be an anchoring stem extending outwardly from the rear face 32 of the plate body 28 along a respective stem axis SA. The anchoring stem 38 may have a generally cylindrical geometry. The anchoring stem 38 may be configured to be at least partially inserted in a bone hole or recess to secure the baseplate 22 along the surgical site S. The stem axis SA may establish a central axis of the baseplate 22. The anchoring stem 38 may be integrally formed with the plate body 28 or may be a separate and distinct component mechanically attached or otherwise secured to the plate body 28. In some implementations, the anchoring stem 38 is between about 8 mm and about 10 mm in diameter and has a length of about 10 mm and about 20 mm, such as about 15 mm.

The plate body 28 may include a plurality of plate apertures 40, as illustrated in FIGS. 3 and 4. The plate apertures 40 may be dimensioned to extend from the front face 30 to the rear face 32 of the plate body 28 to establish a respective passage. The plate perimeter 36 is dimensioned to encircle the plate apertures 40. The plate apertures 40 may include a central aperture 40C and a plurality of peripheral apertures 40P. The central aperture 40C may extend along a projection of the stem axis SA. The peripheral apertures 40P may be circumferentially distributed about the central aperture 40C and stem axis SA. The plate body 28 may define four peripheral apertures 40P circumferentially distributed about the stem axis SA, as illustrated in FIG. 4. It should be understood that fewer or more than four peripheral apertures 40P may be utilized, such as only one peripheral aperture 40P.

Each peripheral aperture 40P may be configured to receive a respective fastener F to affix or otherwise secure the baseplate 22 to bone along the surgical site S (fasteners F shown in dashed lines in FIGS. 3-4 for illustrative purposes). The fasteners F may include anchors or compression screws. The apertures 40 may be countersunk for allowing a head of the fastener F to be flush or recessed within the baseplate 22.

The pad 24 includes a pad body 42 extending in the thickness direction T between an articulating face 44 and a bone contacting face 46 opposed to the articulating face 44. The baseplate 22 may be releasably secured to the pad 24 adjacent the bone contacting face 46, as illustrated in FIG. 3. The plate body may be fully or partially inlayed into an articular surface AS along the surgical site S. The pad body 42 may be overlaid on top of the articular surface AS or inlayed (partially or fully) into the articular surface AS.

Figure 9:
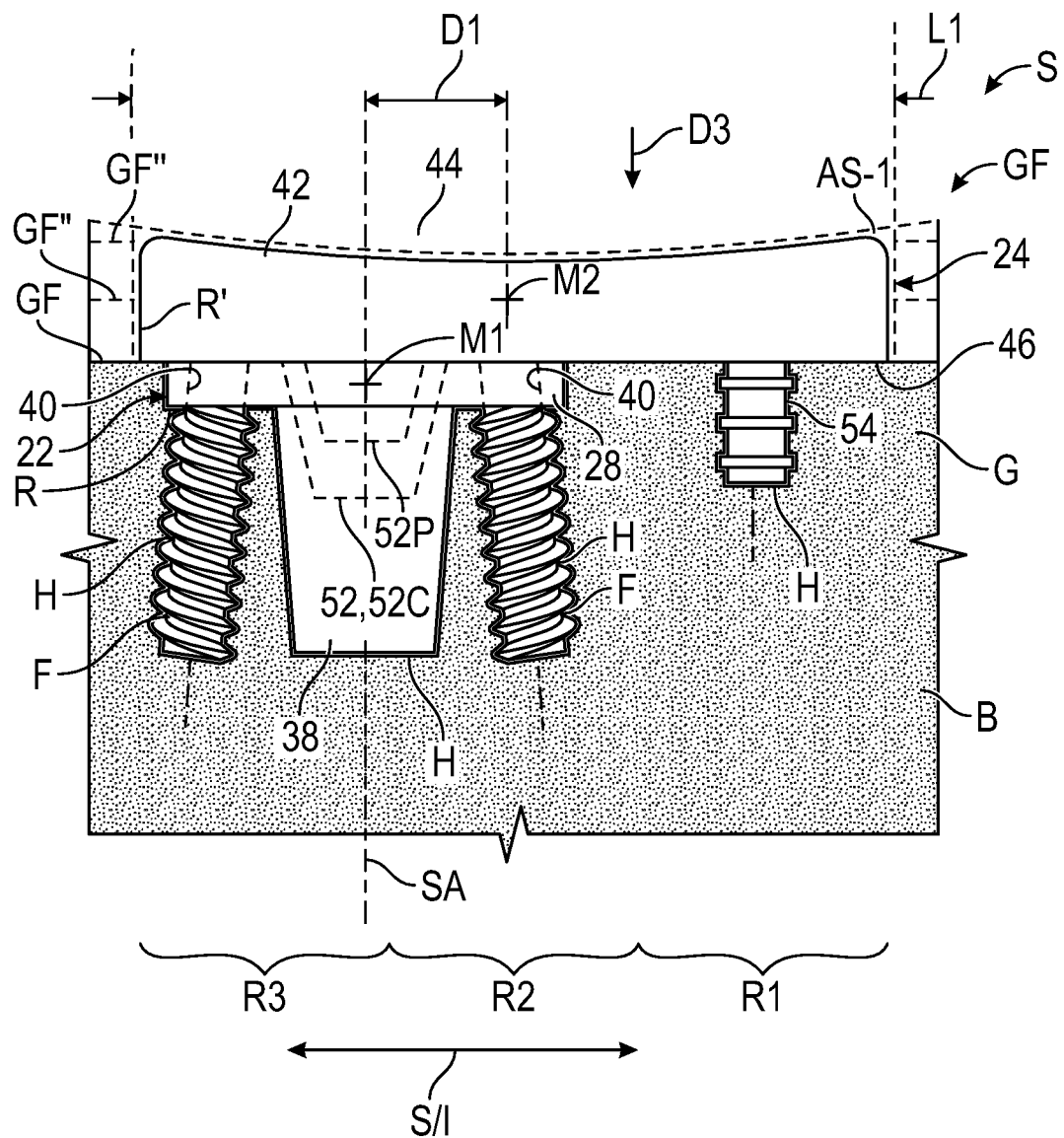
FIG. 9 illustrates an implant system including a baseplate and pad positioned along the surgical site.

The articulating face 44 may have a generally concave geometry that is dimensioned to interface with an opposed articular surface. The opposed articular surface may be associated with a humerus, as illustrated by articular surface AS-1 (FIG. 9). The articular surface AS-1 may be a portion of a humerus or a humeral implant, or an articular surface of another joint.

The bone contacting face 46 may have a generally convex geometry dimensioned to substantially follow a contour of the surgical site S, such an articular surface contour along the glenoid. The bone contacting face 46 may have other geometries, such as a substantially planar geometry.

Figure 5:
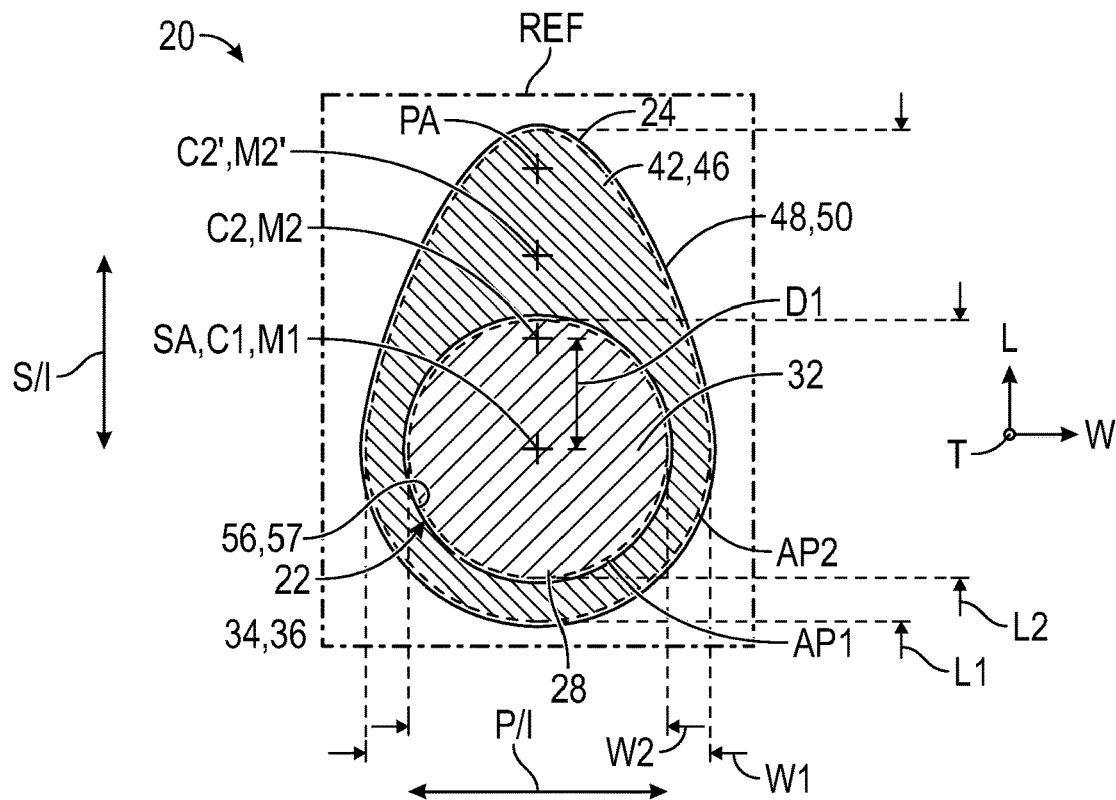
FIG. 5 illustrates a sectional view of the baseplate and pad of FIG. 3.

A peripheral wall 48 of the pad 24 extends in the thickness direction T between the articulating face 44 and bone contacting face 46 to establish a pad perimeter 50 of the pad body 42. The pad perimeter 50 is dimensioned to encircle the articulating face 44 and bone contacting face 46. The pad perimeter 50 may have various geometries. The geometry of the pad perimeter 50 may be the same or may differ from the plate perimeter 36. In some implementations, the pad perimeter 50 and plate perimeter 36 may both have a substantially elliptical geometry. The pad perimeter 50 may be generally oblong or oval shaped, such that a maximum distance of the pad body 42 across the pad perimeter 50 is established in a lengthwise direction L, as illustrated in FIG. 5. A distance of the pad perimeter 50 may be greater than a distance of the plate perimeter 36 such that the pad perimeter 50 substantially encircles the plate perimeter 36, as illustrated in FIG. 5.

The pad 24 may include one or more orientation pegs 52 dimensioned to constrain an orientation of the pad 24 relative to the baseplate 22. Each peg 52 may extend outwardly from the bone contacting face 46, as illustrated in FIG. 3. The pegs 52 may include a central (e.g., first) peg 52C and a peripheral (e.g., second) peg 52P (shown in FIG. 3 and in dashed lines in FIG. 4 for illustrative purposes).

The central peg 52C may be configured to be at least partially received in the central aperture 40C. The peripheral peg 52P may be configured to be at least partially received in a respective one of the peripheral apertures 40P, as illustrated in FIGS. 3 and 4. The central peg 52C and peripheral peg 52P may be dimensioned to have a geometry that substantially complements the respective central aperture 40C and peripheral aperture 40P. The orientation pegs 52 may be dimensioned to limit relative rotation between the plate body 28 and pad body 42 with respect to the stem axis SA when in an installed position, which may improve alignment of the articulating face 44 of the pad 24 relative to a predetermined position along the surgical site S. In some implementations, the peripheral peg 52P is omitted or is dimensioned such that another fastener F is situated in the respective peripheral aperture 40P.

The pad 24 may include at least one protrusion 54 for securing the pad 24 along the surgical site S. The protrusion 54 may be a fluted anchoring peg. The anchoring peg 54 may extend outwardly from the bone contacting face 46 along a peg axis PA. The anchoring peg 54 may include one or more ribs 55 extending outwardly from a periphery of the anchoring peg 54. The ribs 55 may be at least partially deformable to secure the anchoring peg 54 in a respective bone hole.

The anchoring peg 54 may be offset in the lengthwise direction L or otherwise spaced apart from the baseplate 22 in an installed position, as illustrated in FIG. 3. The offsetting arrangement of the anchoring stem 38 and anchoring peg 54 may provide a relatively large fixation area which may improve stability of the pad 24 along the surgical site S.

Various techniques may be utilized for releasably securing or affixing the pad 24 to the baseplate 22. The pad body 42 may define a recess 56 extending inwardly from the bone contacting face 46 (also shown in dashed lines in FIG. 4 for illustrative purposes). The recess 56 may be dimensioned to extend partially through the thickness of the pad body 42, and may be dimensioned to at least partially receive the plate body 28, as illustrated in FIG. 3. A height of the recess 56 may be between about 0.5 mm and about 2.0 mm, such as about 1.5 mm, for example.

A recess perimeter 57 of the recess 56 and the plate perimeter 36 of the plate body 28 may have a complementary geometry, as illustrated in FIGS. 3-5. The plate perimeter 36 may be dimensioned to cooperate with the recess perimeter 57 to establish a Morse Taper connection the limits relative movement between the baseplate 22 and pad 24. The pad 24 may be impacted onto the baseplate 22 such that the Morse Taper connection establishes an interference fit for securing the pad 24 to the surgical site S.

Referring to FIG. 5, with continuing reference to FIG. 3, the pad body 42 may extend a first length L1 in the lengthwise direction L and may extend a first width W1 in a widthwise direction W between opposed sides of the peripheral wall 48. The first length L1 and first width W1 may respectively establish a maximum length and maximum width of the pad body 42 between opposed sides of the peripheral wall 48 that establishes the perimeter 50, as illustrated in FIG. 5. In some implementations, the first width W1 is greater than or equal to about 24 mm, such as between about 33 mm and about 42 mm.

The plate body 28 may extend a second length L2 in the lengthwise direction L and may extend a second width W2 in the widthwise direction W between opposed sides of the peripheral wall 34. The second length L2 and second width W2 may respectively establish a maximum length and maximum width of the plate body 28 between opposed sides of peripheral wall 34 that establish the plate perimeter 36, as illustrated in FIG. 5. The plate perimeter 36 may be substantially circular such that the second length L2 and second width W2 are substantially equal. In some implementations, the second length L2 and/or second width W2 is greater than or equal to about 20.0 mm, or more narrowly is between about 22.0 mm and about 32.0 mm, such as about 24.0 mm.

The pad 24 may be configured to extend beyond the perimeter 36 of the baseplate 22. The baseplate 22 and pad 24 may be dimensioned such that the first width W1 is greater than the second width W2 and/or such that the first length L1 is greater than the second length L2. The baseplate 22 and pad 24 may be dimensioned such that a ratio of the second width W2 to the first width W1 is equal to or greater than about 0.5:1, or more narrowly is equal to or greater than about 0.8:1.

The baseplate 22 and pad 24 may be positioned at various orientations relative to an anatomy of the patient. The lengthwise direction L may correspond to, or have a major component in, a Superior/Inferior (S/I) direction in the installed position. The widthwise direction W may correspond to, or may have a major component in, a Posterior/Inferior (P/I) direction of the patient when the system 20 is in the installed position. The thickness direction T may correspond to, or may have a major component in, a Lateral/Medial (L/M) direction of the patient when the system 20 is in the installed position.

The system 20 may be dimensioned such that the baseplate 22 and pad 24 establish an offset arrangement, which may facilitate a conversion of the system 20 between an anatomical shoulder configuration and a reverse shoulder configuration. A center of the pad 24 may be configured to extend superiorly beyond a center of the baseplate 22 relative to the S/I direction of a glenoid. A portion of the pad body 42 may be configured to extend superiorly beyond the plate body 28 relative to the S/I direction of a glenoid. The various parameters of the offset arrangement disclosed herein may be selected by the surgeon prior to and/or during an anatomical shoulder procedure to establish an anatomical shoulder configuration in a manner that facilitates reconfiguration of the system 20 when revising the surgery at a later date to a reverse shoulder configuration. Selection of the parameters during the earlier procedure may reduce changes to the surgical site in the later procedure, which may improve healing of the patient. The offsetting arrangement of the baseplate 22 and pad 24 in the anatomical shoulder configuration may differ from the reverse shoulder configuration of the system 20, in which the glenosphere 26 may extend relatively more outwardly from the glenoid G and may be more squarely supported by the baseplate 22.

The plate perimeter 36 may be projected onto a reference plane REF to establish a plate area AP1, and the pad perimeter 50 may be projected onto the reference plane REF to establish a pad area AP2 (REF, AP1 and AP2 shown in dashed lines for illustrative purposes). The reference plane REF may extend in the lengthwise and widthwise directions L, W. The plate area A1 and pad area AP2 may be associated with the respective maximum lengths L1, L2 and maximum widths W1, W2. The plate body 28 and pad body 42 may be dimensioned such that an area ratio AP2:AP1 of the pad area AP2 divided by the plate area AP1 is equal to or greater than about 1.5:1. The area ratio AP2:AP1 may be less than or equal to about 4:1, such as between about 2:1 and about 3:1.

The plate area AP1 of the plate body 28 may define a first centroid C1 along the reference plane REF. The first centroid C1 may be substantially aligned or concentric with a projection of the stem axis SA, as illustrated in FIG. 5. The pad area AP2 of the pad body 42 may define a second centroid C2 along the reference plane REF. The pad body 42 may be dimensioned such that the second centroid C2 is offset by a first distance D1 from the first centroid C1 relative to the lengthwise direction L, as illustrated in FIG. 5. The first distance D1 may be defined with respect to the S/I direction. The first distance D1 may be greater than or equal to about 1 mm or 3 mm The first distance D1 may be greater than or equal to about 5 mm, 8 mm or 10 mm.

Figure 6:
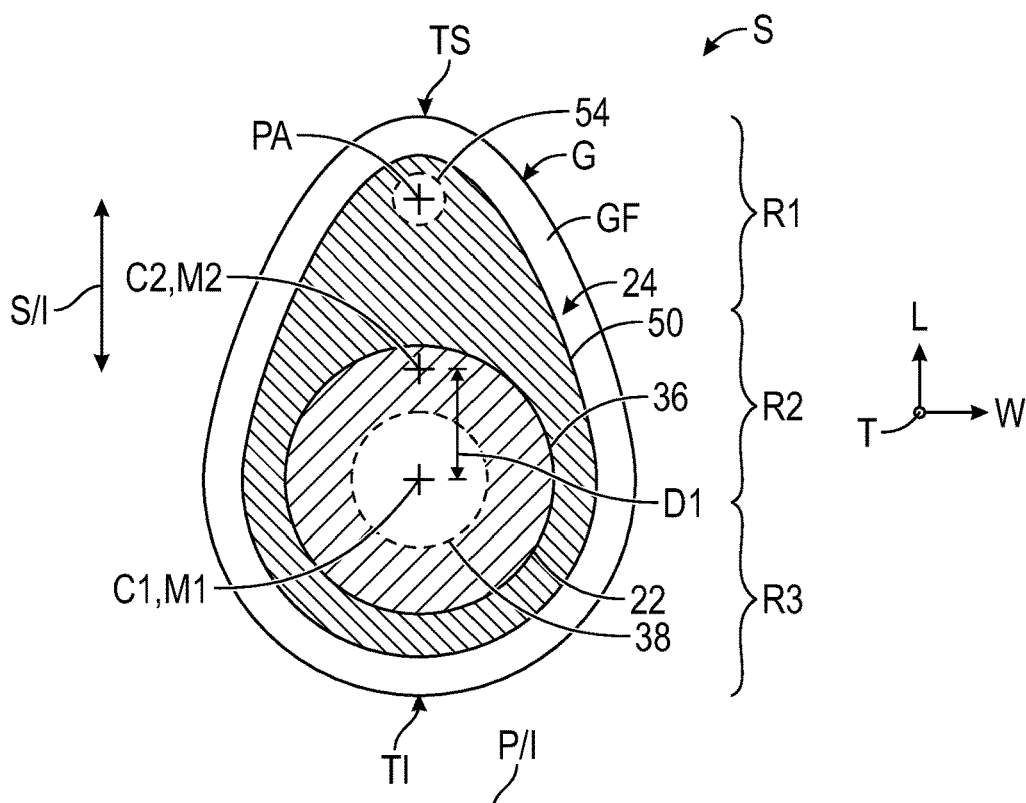
FIG. 6 illustrates a sectional view of the baseplate and pad situated relative to a surgical site.

The baseplate 22 and pad 24 may be configured to establish an offset ratio D1:L1 defined as the first distance D1 divided by the first length L1. The offset ratio D1:L1 may be greater than or equal to about 1:4, or more narrowly greater than or equal to about 1:3 or about 1:2. The offset ratio D1:L1 may be established such that the second centroid C2 is superiorly offset from the first centroid C1 relative to the S/I direction, as illustrated in FIG. 6. The offset ratio D1:L1 may be established such that the second centroid C2 is encircled by the perimeter 36 of the plate body 28, as illustrated in FIG. 5. In some implementations, the offset ratio D1:L1 is established such that the second centroid C2 is positioned outside of the perimeter 36 of the plate body 28, as illustrated by second centroid C2' in FIG. 5.

Referring to FIG. 6, with continuing reference to FIG. 5, a glenoid face GF of the glenoid G may be divided into three substantially equal regions R1-R3, including a superior region R1, an intermediate region R2, and an inferior region R3 relative to the S/I direction. The intermediate region R2 is established between the superior and inferior regions R1, R3. The superior region R1 may extend from the supraglenoid tubercle TS of the glenoid G, and the inferior region R3 may extend from an infraglenoid tubercle TI of the glenoid G.

The offset configuration of the baseplate 22 and pad 24 may be established with respect to the centers of mass of the plate body 28 and pad body 42. The plate body 28 may define a first center mass M1. The plate area AP1 may be associated with the first center of mass M1. The pad body 42 may define a second center of mass M2. The pad area AP2 may be associated with the second center of mass M2.

The pad body 42 may be dimensioned such that the second center of mass M2 is superiorly offset from the first center of mass M1 by the first distance D1 relative to the S/I direction in the installed position, as illustrated in FIG. 6. The first center mass M1 may substantially coincide with the first centroid C1, and the second center mass M2 may substantially coincide with the second centroid C2, as illustrated in FIGS. 5-6. In some implementations, the second center of mass M2 is positioned outside of the perimeter 36 of the plate body 28, as illustrated by second center of mass M2' in FIG. 5. The second center mass M2' may substantially coincide with the second centroid C2', as illustrated in FIGS. 5. In other implementations, the first and/or second centroids C1, C2, C2' are offset from the respective centers of mass M1, M2, M2'. The centers of mass M1, M2 exclude any protrusions extending outwardly from the respective plate body and pad body 42, such as the anchoring stem 38 of the baseplate 22 and the pegs 52, 54 of the pad 24.

Figure 7:
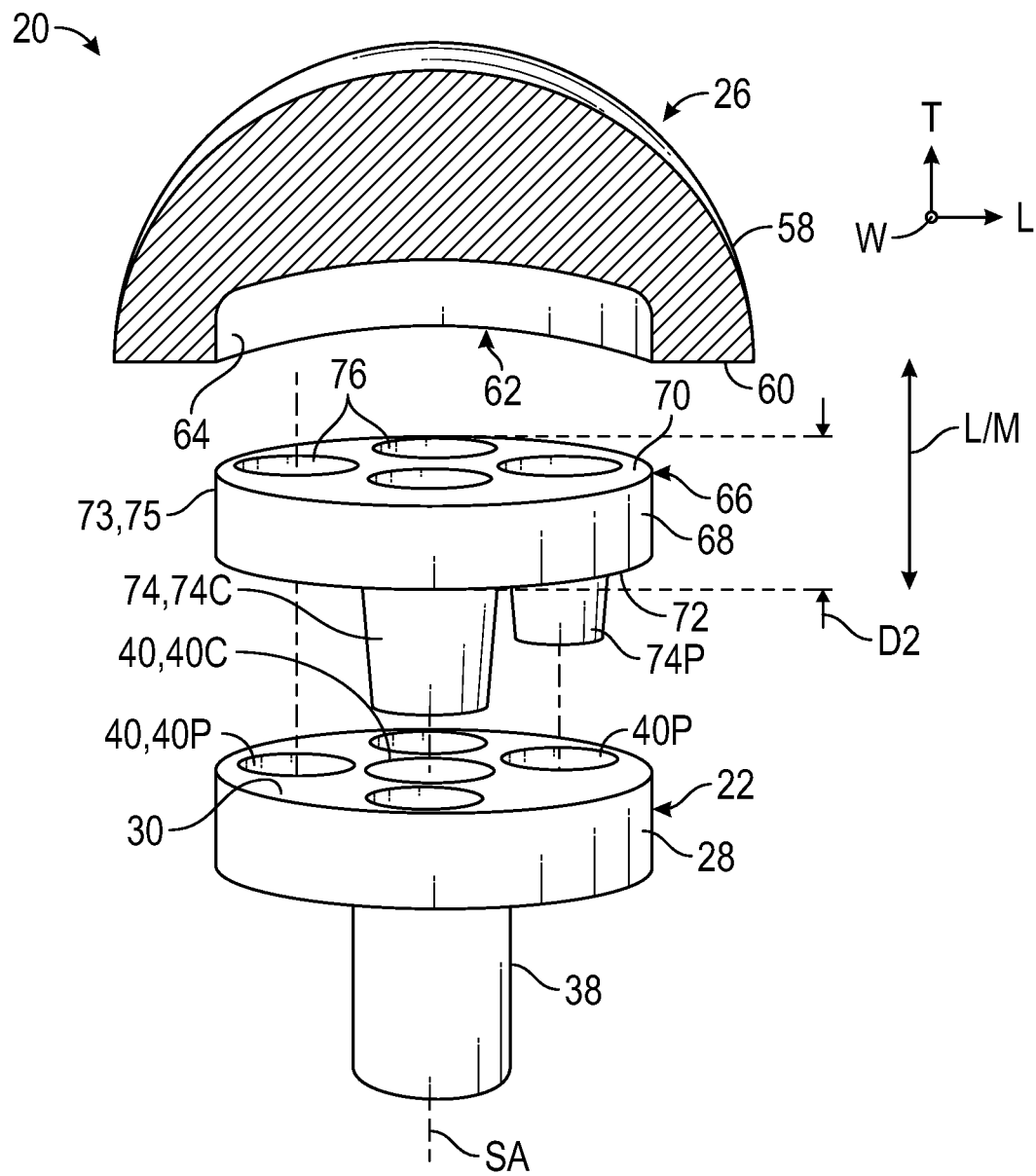
FIG. 7 illustrates an exploded view of the implant system of FIG. 2.

Referring to FIG. 7, with continuing reference to FIG. 2, the system 20 may include at least one glenosphere 26. The glenosphere 26 includes an articulating surface 58 and a rear face 60 opposed to the articulating surface 58. The articulating surface 58 may have a generally convex geometry.

Figure 10:
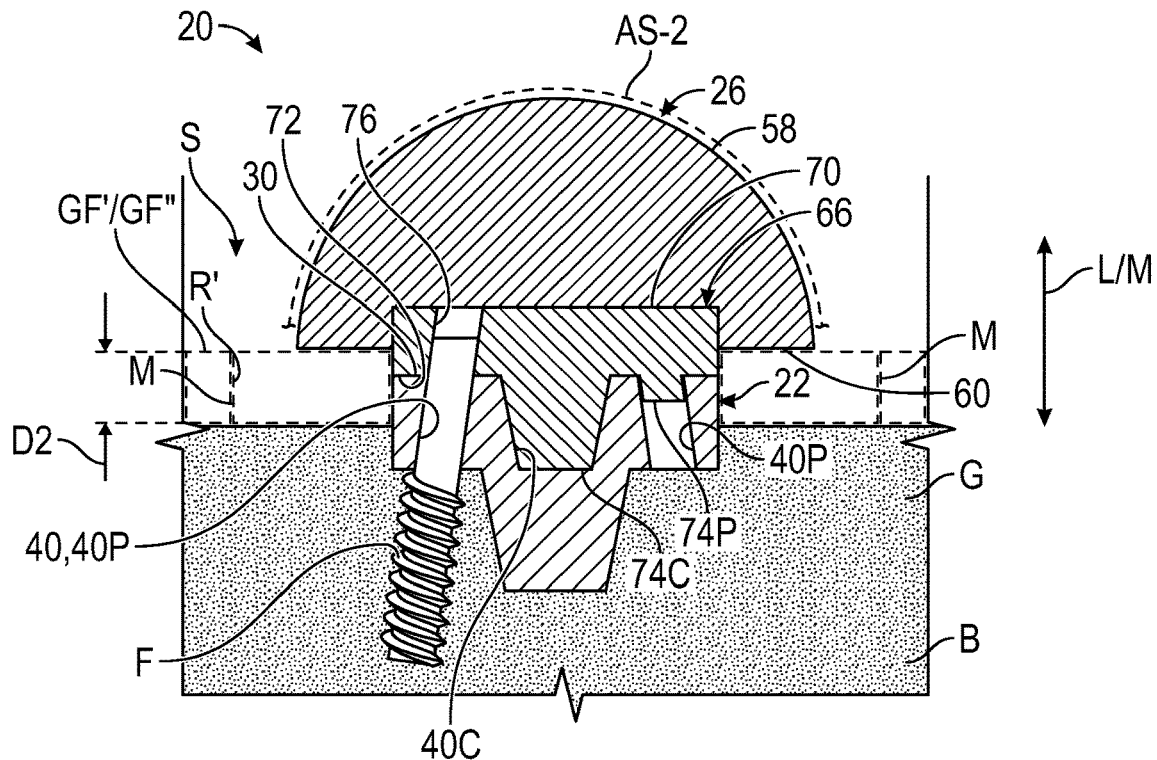
FIGS. 10-12 illustrate the implant system including the baseplate of FIG. 9 and a glenosphere positioned along the surgical site.
Figure 12:
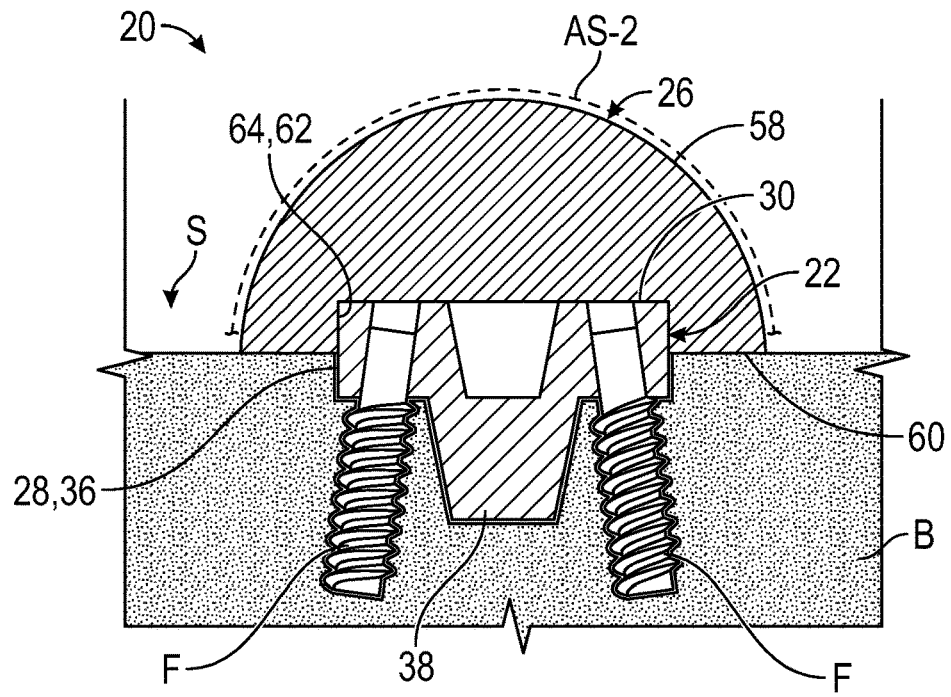

The glenosphere 26 may be dimensioned to selectively interface with the baseplate 22 directly as illustrated in FIG. 12 or indirectly via a spacer 66 (e.g., taper adapter) as illustrated in FIG. 10. Selection of a spacer 66 may provide a surgeon different options for lateralization or otherwise positioning the glenosphere 26 relative to the surgical site.

Various techniques may be utilized to releasably secure or affix the glenosphere 26 directly or indirectly to the baseplate 22. The glenosphere 26 may include a recess 62 extending inwardly from the rear face 60. The recess 62 may be dimensioned to at least partially receive the plate body 28, as illustrated in FIG. 12. The plate perimeter 36 may be dimensioned to cooperate with a perimeter 64 of the recess 62 to establish a Morse Taper connection that limits relative movement between the baseplate 22 and glenosphere 26. During assembly, the glenosphere 26 may be impacted onto the plate body 28 to establish the Morse Taper connection.

Each spacer 66 includes a spacer body 68 extending in the thickness direction T between a front face 70 and a rear face 72 opposed to the front face 70. The front face 70 may be dimensioned to abut the glenosphere 26, and the rear face 72 may be dimensioned to abut the baseplate 22. A peripheral wall 73 extends in the thickness direction T between the front face 70 and rear face 72 to establish a spacer perimeter 75. The spacer perimeter 75 may be dimensioned to encircle the front face 70 and rear face 72. The spacer perimeter 75 may have various geometries such as substantially circular or elliptical geometry that complements a geometry of the recess 62. In some implementations, an opposite arrangement is established in which the recess 56 of the pad body 42 and/or the recess 64 of the glenosphere 26 are omitted and a respective recess is established in the plate body 28 to receive a portion of the pad body 28 and/or a respective recess is established in the spacer body 68 to receive a portion of the glenosphere 26 to secure the respective components.

Each spacer 66 may be dimensioned to interface with the plate body 28 and glenosphere 26 such that the glenosphere 26 is offset or spaced apart from the plate body 28 by a predetermined distance D2 (FIG. 10). The predetermined distance D2 may correspond to a thickness of the spacer 66 and may extend in the L/M direction of the glenoid. The implant system 20 may include a plurality of spacers 66 having different thicknesses to provide a range of lateral offsets corresponding to different predetermined distances D2. The predetermined distances D2 may be in various increments such as about 0 mm, 2 mm, 4 mm and 6 mm, for example.

The spacer 66 may include one or more spacer pegs 74 extending outwardly from the spacer body 68. The spacer pegs 74 may be configured for insertion into respective plate apertures 40 of the baseplate 22. The spacer pegs 74 may include a central spacer peg 74C that is at least partially insertable into the central aperture 40C of the baseplate 22. The spacer pegs 74 may include at least one peripheral spacer peg 74P that is at least partially insertable into a respective one of the peripheral apertures 40P of the baseplate 22. The peripheral spacer peg 74P may be offset from the central spacer plate 74C such that insertion of the spacer peg 74C, 74P into the respective apertures 40C, 40P limits relative rotation between the baseplate 22 and spacer 66 in an installed position. In some implementations, the peripheral spacer peg 74P is omitted or is dimensioned such that another fastener F is situated in the respective peripheral aperture 40P.

The spacer 66 may include one or more spacer apertures 76 each dimensioned to be substantially aligned with a respective plate aperture 40 such that fasteners F are insertable through respective pairs of plate apertures and spacer apertures 40, 76 and into bone B along the glenoid G to secure the baseplate 22, as illustrated in FIG. 10. The apertures 76 may be countersunk for allowing a head of the fastener F to be flush or recessed within the spacer 66.

Figure 11:
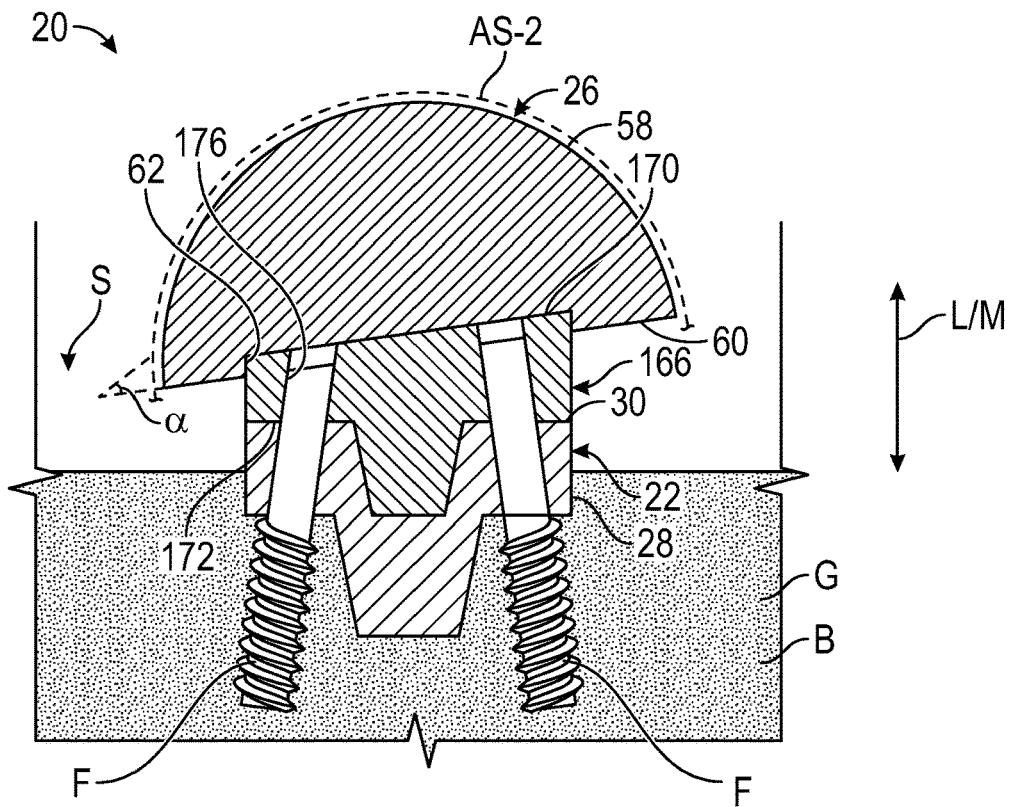

The system 20 may include a plurality of spacers 66, 166 that establish different orientations between the baseplate 22 and glenosphere 26, as illustrated in FIGS. 10 and 11. The system 20 may include at least one spacer 66 having the front face 70 substantially parallel to the rear face 72 such that the rear face 60 of the glenosphere 26 is substantially parallel to the front face 30 of the baseplate 22 in the installed position, as illustrated in FIG. 10.

The system 20 may include at least one spacer 166 having a front face 170 transverse to a rear face 172 such that the rear face 60 of the glenosphere 26 is transverse to the front face 30 of the baseplate 22 in the installed position, as illustrated in FIG. 11. The front face 170 is arranged transversely relative to the rear face 172 of the spacer 166 to establish an angle α. The angle α may be greater than or equal to about 5 degrees, or more narrowly between about 10 degrees and about 45 degrees, for example. The spacers 66, 166 disclosed herein may be utilized to position and/or orient the glenosphere 26 more closely to an articulating surface of a humeral implant in a reverse shoulder procedure, which may improve mobility of the joint.

Various materials can be utilized to form the components of the system 20. The materials of the baseplate 22, pad 24, spacers 66, 166 and glenosphere 26 may be the same or may differ, and may comprise metallic materials such as surgical grade metals and metal alloys, non-metallic materials and combinations thereof. One or more coatings or layers 78 may be deposited along surfaces of the baseplate 22 (shown in dashed lines in FIG. 3 for illustrative purposes). Example coatings 78 may include calcium phosphate (CaP) or a biomaterial for promoting bone ingrowth. In some implementations, one or more surfaces of the baseplate 22 are textured or have a porous structure to facilitate ingrowth of bone into the baseplate 22. The pad 24 may be formed of a non-metallic material such as a polyethylene, nylon or ceramic compound, for example. Each of the components of the system 20 may have a monolithic construction or may each include a plurality of separate and distinct components.

Figure 8:
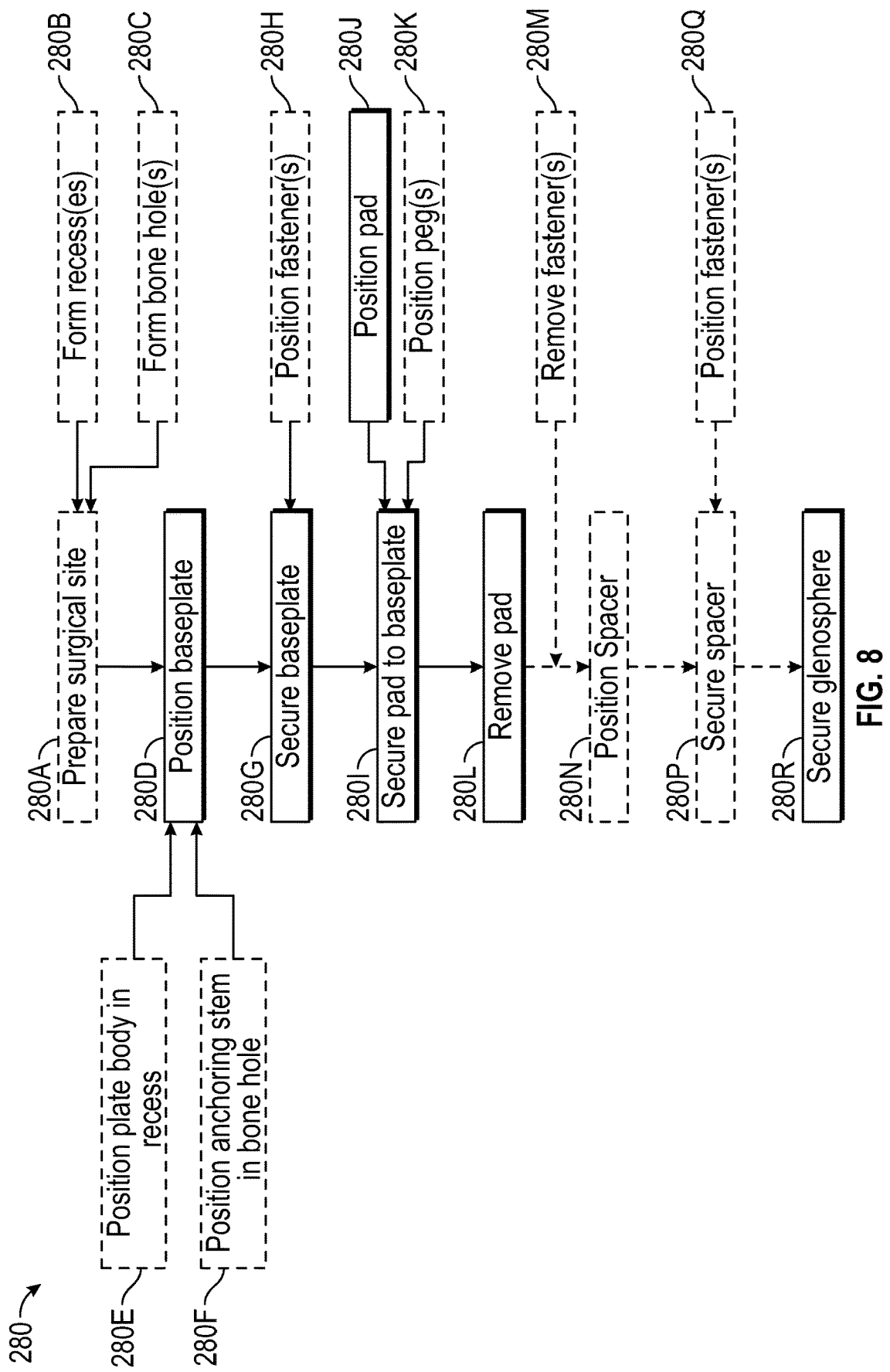
FIG. 8 illustrates an exemplary method of installing an orthopaedic implant system at a surgical site.

FIG. 8 illustrates a method of installing a convertible orthopedic implant system in a flowchart 280. The method 280 may be utilized to perform an arthroplasty for restoring functionality to shoulders having advanced cartilage disease, for example. The method 280 may be utilized with any of the orthopedic implants and implant systems disclosed herein, including implant systems 20, 120. The method 280 may include one or more steps to convert the implant system 20, 120 between a first configuration and a second configuration. The first configuration may correspond to an anatomical shoulder procedure or arrangement, and the second configuration may correspond to a reverse shoulder procedure or arrangement, or vice versa. Steps 280I-280K may be performed in an anatomical shoulder procedure, and steps 280L-280R may be performed in a reverse shoulder procedure, for example. Fewer or additional steps than are recited below could be performed within the scope of this disclosure, and the recited order of steps is not intended to limit this disclosure.

The disclosed implant system may be provided to the surgeon as a kit. The kit may include one or more baseplates, pads, glenospheres and spacers of various shapes and sizes. The particular components may be selected from the kit according to an anatomy of the patient.

Referring to FIG. 9, with continuing reference to FIG. 8, a surgical site S may be prepared at step 280A. One or more operations can be performed to prepare the surgical site S, such as one or more reaming, milling and drilling operations to establish a desired geometry of the surgical site S. Step 280A may include forming recess(es) R by removing tissue such as bone B along the surgical site S at step 280B.

The recess R may be formed in an articular surface of a joint such as the glenoid face GF. Step 280A may include forming one or more bone holes H at step 280C. Each bone hole H may extend inwardly from the recess R or glenoid face GF. In implementations, step 280A can include provisionally placing trial(s) of the baseplate 22 and/or pad 24 along the surgical site S to select a position and/or orientation of the recess(es) R and bone hole(s) H that are subsequently formed by removing a portion of the bone B at steps 280B, 280C.

At step 280D, the baseplate 22 may be positioned along the surgical site S, such as along the glenoid face GF. Step 280D may include moving the baseplate 22 in a direction D3 and positioning the plate body 28 at least partially in the recess R at step 280E. In other implementations, step 280D includes positioning the plate body 28 to sit on an outer surface along the glenoid face GF. Step 280D may include positioning the anchoring stem 38 of the baseplate 22 at least partially in a respective bone hole H at step 280F. Step 280F may occur such that the stem axis SA is positioned in the inferior region R3 of the glenoid G. The more inferior location of the baseplate 22 on the glenoid G and the geometry of the pad 24 to extend superior to the baseplate 22 relative to the S/I direction may provide a more suitable location of the baseplate 22 for subsequent attachment of a glenosphere without affecting placement of the pad 24 relative to the opposed articular surface AS-1 (FIG. 9). A smaller area of the glenoid G may be used for affixing the baseplate 22, and the bone contacting face 46 of the pad 24 may be configured to abut against the glenoid face GF or another surface of the glenoid G to maintain security of the pad 24 along the surgical site.

At step 280G, the baseplate 22 may be secured to the surgical site S. Step 280G may include positioning one or more fasteners F in respective plate apertures 40 to secure the baseplate 22 to bone along the glenoid G, for example. The fasteners F may be compression screws that may apply and maintain compression between the baseplate 22 and bone which may reduce relative motion and tissue formation that may otherwise occur due to spacing between the contact surfaces of the baseplate 22 and bone.

At step 280I, the pad 24 is releasably secured or affixed to the baseplate 22. Step 280I may include positioning the pad 24 relative to the baseplate 22 and the glenoid G in response to moving the pad 24 in the direction D3 at step 280J. The pad 24 may be impacted onto the baseplate 22 to establish an interference fit via a Morse Taper connection. Step 280J may occur such that the bone contacting face 46 of the pad 24 contacts bone along the glenoid G adjacent the glenoid face GF, and such the bone contacting face 46 substantially follows the contour of the glenoid face GF. Step 280I may occur such that relative movement between the plate body 28 and pad body 42 is limited in at least the S/I direction of the glenoid G.

The pad body 42 may be placed at different depths relative to an articular surface such as the glenoid face GF. In some implementations, the pad 24 is placed in an overlay position such that the pad body 42 sits on the glenoid face GF and such that the bone contacting face 46 follows a contour of the glenoid face GF, as illustrated in FIG. 9. In other implementations, positioning the pad 24 at step 280J includes at least partially or completely inlaying the pad body 42 in a recess R' along the glenoid face GF, as illustrated by glenoid faces GF', GF", respectively.

Step 280I may include positioning one or more orientation pegs 52 of the pad 24 into respective plate apertures 40 of the baseplate 22, such as the central peg 52C and the peripheral peg 52P. Positioning the pegs 52 at step 280I may limit relative rotation between the baseplate 22 and pad 24.

Positioning the baseplate 22 at step 280D may occur such that the anchoring stem 38 is situated in the inferior region R3, and the first centroid C1 and/or the first center of mass M1 of the plate body 28 is situated in the inferior region R3 and/or is substantially aligned with a projection of the stem axis SA, as illustrated in FIGS. 6 and 9. Securing the pad 24 at step 280I may occur such that the second centroid C2 and/or second center of mass M2 of the pad body 42 is situated in the intermediate region R2, as illustrated in FIGS. 6 and 9. The centers of mass M1, M2 and/or anchoring stem 38 may be positioned below the supraglenoid tubercle TS and may be positioned above the infraglenoid tubercle TI of the glenoid G, as illustrated in FIG. 6.

The pad 24 may be secured to the baseplate 22 at step 280I such that the anchoring peg 54 and/or second center of mass M2 of the pad 24 are superiorly offset from the first center mass M1 of the baseplate 22 by the first distance D1 relative to the S/I direction of the glenoid G when in the first position, as illustrated in FIG. 9. The first center of mass M1 may be offset inferiorly to the second center of mass M2 relative to the S/I direction in the first position. The pad 24 may be secured to the baseplate 22 at step 280I such that the first and second centers of mass M1, M2 are situated in different regions R1-R3. For example, the first center of mass M1 may be situated along the inferior region R3, and the second center of mass M2 may be situated along the intermediate region R2, as illustrated in FIG. 9.

The baseplate 22 and pad 24 may be arranged to establish the first distance D1 according to any of the offset ratios disclosed herein. Securing the pad 24 at step 280I may occur such that at least 25% of the pad area AP2 and/or at least 25% of the first length L1 (FIG. 5) of the pad body 42 are superiorly offset from the first center of mass M1 relative to the S/I direction, as illustrated in FIG. 9.

At step 280L, the pad 24 may be removed from the baseplate 22 at a first position relative to the surgical site S, such as the glenoid G, which may occur subsequent to securing the pad at step 280I. One or more of the fasteners F may be removed from the baseplate 22 at step 280M. One or more portions of the baseplate 22 may include a porous structure and/or coating(s) 78 (FIG. 3) to promote bone ingrowth. The bone ingrowth may facilitate the baseplate 22 remaining attached to bone B along the recess R after removing the fasteners F.

Referring to FIG. 10, with continuing reference to FIG. 8, a spacer 66 may be positioned relative to the baseplate 22 at step 280N. The spacer 66 may be selected to provide a predetermined lateralization and/or angular offset from the baseplate 22. The spacer pegs 74C, 74P may be positioned in respective ones of the central and peripheral apertures 40C, 40P to limit relative rotation between the baseplate 22 and spacer 66. Step 280N may include positioning the spacer 166 relative to the baseplate 22 such that the front face 170 is arranged transversely relative to the rear face 172 of the spacer 166 to establish the angle α, as illustrated in FIG. 11. The angle α may include any of the values disclosed herein. The selected spacer 66, 166 may be impacted onto the baseplate 22 to establish an interference fit via a Morse Taper connection.

At step 280P, the spacer 66 may be secured to the baseplate 22 with one or more fasteners F (one shown for illustrative purposes). At step 280Q, one or more fasteners F may be positioned in respective pairs of plate apertures 40 and spacer apertures 76 to secure the spacer 66 and baseplate 22 to the surgical site S.

At step 280R, the glenosphere 26 is secured to the baseplate 22, which may occur subsequent to removing the pad 24 at step 280L. The articulating surface 58 of the glenosphere 26 may have having a generally convex geometry dimensioned to interface with an opposed articular surface. The opposed articular surface may be associated with a humerus, as illustrated by articular surface AS-2 (shown in dashed lines in FIGS. 10-12 for illustrative purposes). The articular surface AS-2 may have a generally concave geometry that complements the geometry of the articulating surface 58 of the glenosphere 26. The articular surface AS-2 may be a portion of a humerus or a humeral implant, or an articular surface of another joint. The articular surfaces AS-1, AS-2 of FIGS. 3 and 10-12 may be the same or may differ.

A selected spacer 66 may be secured between the baseplate 22 and glenosphere 26 such that the glenosphere 26 is laterally spaced apart from the baseplate 22 by the predetermined distance D2 relative to the L/M direction of the glenoid G, as illustrated in FIG. 10. A selected spacer 166 may be positioned at step 280N and secured at step 280R such that the rear face 60 of the glenosphere 26 is oriented transversely to the front face 30 of the baseplate 22, as illustrated in FIG. 11. The spacer 166 may be dimensioned such that a portion of the glenosphere 126 defining the recess 62 is spaced apart from the baseplate 22 by at least a minimum thickness of the spacer body 168. The glenosphere 26 may be impacted onto the selected spacer 66, 166 to establish an interference fit via a Morse Taper connection.

Step 280R may include preparing the surgical site S prior to positioning the glenosphere 26. In some implementations in which the pad 24 is at least partially or fully inlaid into the glenoid face GF'/GF'', material M may be placed in the respective recess R' subsequent to removing the pad 24 at step 280L (M shown in dashed lines in FIG. 10 for illustrative purposes). The material M may be a bone graft or a bony slurry, for example. The material M may be substantially flush with the adjacent glenoid face GF'/GF''.

Figure 13:
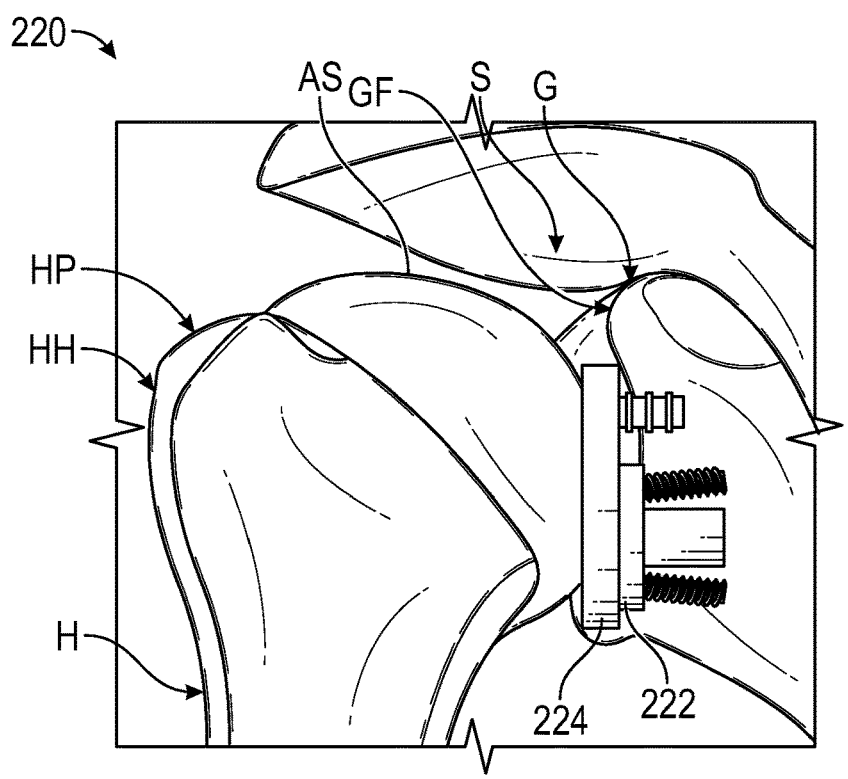
FIG. 13 illustrates an implant system in an anatomical shoulder configuration.

FIG. 13 illustrates a system 220 including a baseplate 222 and pad 224 situated relative to a surgical site S. The surgical site S may be a shoulder joint including a glenoid G and humerus H. The pad 224 may cooperate with an articular surface AS of a humeral head HH of the humerus H.

Figure 14:
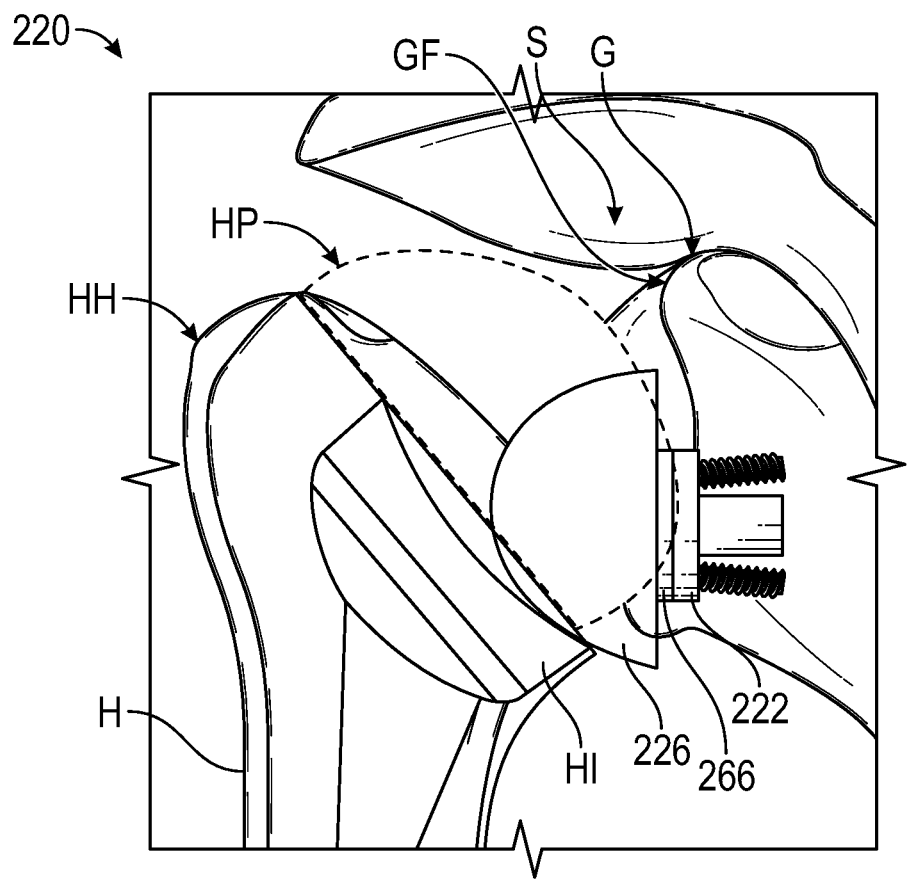
FIG. 14 illustrates the implant system of FIG. 13 in a reverse shoulder configuration.

FIG. 14 illustrates the system 220 including a glenosphere 226 and a spacer 366 secured to the baseplate 222 adjacent the surgical site S. The glenosphere 226 cooperates with a humeral implant HI situated adjacent the humeral head HH. A portion HP of the humeral head HH may be excised by performing an osteotomy (HP shown in dashed lines in FIG. 14 for illustrative purposes).

The novel implant systems and methods of this disclosure may provide versatility in restoring functionality to a joint. Various components of the disclosed implant system may remain in situ during a subsequent arthroplasty, such as a common baseplate utilized in both an anatomical and reverse shoulder procedure on the same patient, which may improve healing and reduce parts counts. Offsetting the pad relative to the baseplate utilizing the techniques disclosed herein may facilitate revising the surgery at a later date from an anatomical shoulder configuration to a reverse shoulder configuration, which may be more suitable due to a progression of glenohumeral joint disease in the patient. The disclosed offsetting techniques may provide a more suitable position for a common baseplate reused in the reverse shoulder configuration. A smaller area of the glenoid may be used for affixing the baseplate, while abutment of the bone contacting face of the pad outward of the baseplate may improve stabilization of the pad along the glenoid. An attached glenosphere may be more suitably placed to avoid scapular notching during preparation of the glenoid.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should further be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure.

What is claimed is:

1. An implant for a shoulder replacement, the implant comprising:
   a circular baseplate configured to be embedded in or on a glenoid; and
   an oblong pad configured to interface with a humerus or humeral implant, wherein a center of the pad is configured to extend superiorly beyond a center of the baseplate relative to a superior-inferior direction of the glenoid, and wherein at least 25% of a pad area of the pad and/or a length of the pad extends superior to the baseplate relative to the superior-inferior direction.

2. The implant as recited in claim 1, wherein a center of mass of the baseplate is offset inferiorly to a center of mass of the pad.

3. The implant as recited in claim 1, further comprising a glenosphere releasably secured to the baseplate.

4. The implant as recited in claim 3, further comprising a spacer dimensioned to establish a lateral offset and/or angular offset of the glenosphere relative to the baseplate.

5. The implant as recited in claim 1, wherein at least 25% of the pad area extends superior to the baseplate relative to the superior-inferior direction, and at least 25% of the length of the pad extends superior to the baseplate relative to the superior-inferior direction.

6. A convertible orthopaedic implant system for a shoulder replacement that interfaces with an opposed articular surface associated with a humerus, comprising:
   a baseplate including a plate body configured to be at least partially embedded in or on a glenoid, the plate body extending in a thickness direction between a front face and a rear face; and
   a pad including a pad body extending in the thickness direction between an articulating face and a bone contacting face, the pad body extending a first length in a lengthwise direction between opposed sides of a peripheral wall that establishes a perimeter of the pad body, and the articulating face dimensioned to interface with the opposed articular surface associated with the humerus;
   wherein the baseplate is releasable securable to the pad adjacent the bone contacting face;
   wherein a perimeter of the plate body projected onto a reference plane defines a plate area associated with a first centroid, wherein the perimeter of the pad body projected onto the reference plane defines a pad area associated with a second centroid, and the pad body is dimensioned such that the second centroid is offset by a first distance from the first centroid relative to the lengthwise direction;
   wherein the perimeter of the plate body is substantially circular, and the perimeter of the pad body is oblong; and
   wherein an offset ratio of the first distance divided by the first length is at least 1:4 such that the second centroid is superiorly offset from the first centroid relative to a superior-inferior direction of the glenoid, an area ratio of the pad area divided by the plate area is greater than or equal to 1.5:1, and/or a ratio of a maximum width across the perimeter of the plate body to a minimum width across the perimeter of the pad body is equal to or greater than 0.5:1.

7. The system as recited in claim 6, wherein the pad comprises a metallic material.

8. The system as recited in claim 6, wherein the pad has a monolithic construction and comprises a non-metallic material, and the plate body comprises a metallic material.

9. The system as recited in claim 6, wherein:
   the plate body includes a plurality of peripheral apertures configured to receive respective fasteners to secure the baseplate to bone; and
   the baseplate includes an anchoring stem extending outwardly from the rear face of the plate body along a stem axis, and the anchoring stem is configured to be at least partially inserted in a bone hole to secure the baseplate.

10. The system as recited in claim 9, wherein the first centroid of the plate body is substantially aligned with a projection of the stem axis.

11. The system as recited in claim 9, wherein:
    the peripheral apertures are circumferentially distributed about a central aperture in the plate body, and the central aperture extends along a projection of the stem axis; and
    the pad includes first and second pegs extending outwardly from the bone contacting face, the first peg configured to be received in the central aperture and the second peg configured to be received in a respective one of the peripheral apertures to limit relative rotation between the plate body and the pad body with respect to the stem axis.

12. The system as recited in claim 6, further comprising a glenosphere including an articulating surface having a generally convex geometry, and wherein the glenosphere is releasably securable to the baseplate.

13. The system as recited in claim 12, wherein one of the pad and the glenosphere comprises a metallic material, and another one of the pad and the glenosphere comprises a non-metallic material.

14. The system as recited in claim 13, wherein the pad comprises a metallic material.

15. The system as recited in claim 13, wherein the pad comprises a non-metallic material.

16. The system as recited in claim 12, wherein the glenosphere includes a recess dimensioned to at least partially receive the plate body.

17. The system as recited in claim 16, wherein the perimeter of the plate body is dimensioned to cooperate with a perimeter of the recess to establish a Morse taper connection that limits relative movement between the baseplate and the glenosphere.

18. The system as recited in claim 12, further comprising a spacer configured to interface with the plate body and the glenosphere such that the glenosphere is spaced apart from the plate body by a predetermined distance.

19. The system as recited in claim 18, wherein the spacer is dimensioned such that a rear face of the glenosphere is transversely angled relative to the front face of the plate body.

20. The system as recited in claim 18, wherein:
    the plate body includes a plurality of plate apertures;
    the spacer includes one or more pegs configured for insertion into respective ones of the plate apertures; and
    the spacer includes one or more spacer apertures that substantially align with respective ones of the plate apertures such that respective fasteners are insertable through each respective pair of the plate and spacer apertures and into the glenoid to secure the baseplate.

21. The system as recited in claim 6, wherein the offset ratio of the first distance divided by the first length is at least 1:4 such that the second centroid is superiorly offset from the first centroid relative to the superior-inferior direction of the glenoid.

22. The system as recited in claim 6, wherein the area ratio of the pad area divided by the plate area is greater than or equal to 1.5:1.

23. The system as recited in claim 6, wherein the ratio of the maximum width across the perimeter of the plate body to the minimum width across the perimeter of the pad body is equal to or greater than 0.5:1.

24. The system as recited in claim 6, wherein the offset ratio of the first distance divided by the first length is at least 1:4 such that the second centroid is superiorly offset from the first centroid relative to the superior-inferior direction of the glenoid, the area ratio of the pad area divided by the plate area is greater than or equal to 1.5:1, and the ratio of the maximum width across the perimeter of the plate body to the minimum width across the perimeter of the pad body is equal to or greater than 0.5:1.

25. A method of installing a convertible orthopaedic implant system that interfaces with an opposed articular surface associated with a humerus, comprising:
    positioning a circular baseplate relative to a glenoid face of a glenoid, the baseplate including a plate body extending in a thickness direction between a front face and a rear face, and the baseplate including one or more plate apertures;
    positioning at least one fastener in a respective one of the plate apertures to secure the baseplate to the glenoid; and
    releasably securing an oblong pad to the baseplate, wherein the pad includes a pad body extending in the thickness direction between an articulating face and a bone contacting face, the pad body extending a first length between opposed sides of a peripheral wall that establishes a perimeter of the pad body, the articulating face dimensioned to interface with the opposed articular surface associated with the humerus, and wherein the bone contacting face contacts bone along the glenoid;
    wherein the plate body defines a first center of mass, the pad body defines a second center of mass, and the pad body is dimensioned such that the second center of mass is superiorly offset from the first center of mass by a first distance relative to a superior-inferior direction of the glenoid in response to the step of securing the pad; and
    wherein the step of securing the pad occurs such that at least 25% of a pad area of the pad and at least 25% of the first length of the pad body are superiorly offset from the first center of mass of the plate body relative to the superior-inferior direction.

26. The method as recited in claim 25, wherein:
    an anchoring stem extends outwardly from the rear face of the plate body along a stem axis;
    the step of positioning the baseplate includes forming a recess in the glenoid, positioning at least a portion of the plate body in the recess, and positioning the anchoring stem at least partially in a bone hole that extends inwardly from the recess; and
    the step of securing the pad includes positioning the pad body such that the bone contacting face follows a contour of the glenoid face.

27. The method as recited in claim 25, wherein:
    the step of securing the pad occurs such that an offset ratio of the first distance divided by the first length is at least 1:4; and/or
    a perimeter of the plate body projected onto a reference plane defines a first plate area, the perimeter of the pad body projected onto the reference plane defines the pad area, and an area ratio of the pad area divided by the plate area is greater than or equal to 1.5:1.

28. The method as recited in claim 27, wherein:
    the area ratio is between 2:1 and 3:1;
    the glenoid face is divided into three equal regions including a superior region, an intermediate region and an inferior region relative to the superior-inferior direction, the intermediate region between the superior and inferior regions;
    the step of positioning the baseplate occurs such that the first center of mass of the plate body is situated in the inferior region, and/or
    the step of securing the pad occurs such that the second center of mass of the pad body is situated in the intermediate region.

29. The method as recited in claim 28, wherein:
    an anchoring stem extends outwardly from the rear face of the plate body along a stem axis, and the first center of mass of the plate body is substantially aligned with a projection of the stem axis;
    the step of positioning the baseplate includes forming a recess in the glenoid, positioning at least a portion of the plate body in the recess, and positioning the anchoring stem at least partially in a bone hole that extends inwardly from the recess such that the stem axis is positioned in the inferior region; and
    the step of securing the pad includes positioning the pad body such that the bone contacting face follows a contour of the glenoid face.

30. The method as recited in claim 25, further comprising:
    removing the pad from the baseplate subsequent to the step of securing the pad; and
    securing a glenosphere to the baseplate in situ subsequent to the step of removing the pad, the glenosphere including an articulating surface having a generally convex geometry dimensioned to interface with a humeral implant.

31. The method as recited in claim 30, further comprising:
    securing a spacer between the baseplate and the glenosphere such that the glenosphere is laterally spaced apart from the plate body by a predetermined distance relative to a lateral-medial direction of the glenoid.

32. The method as recited in claim 31, wherein the spacer is dimensioned such that a rear face of the glenosphere is transversely angled relative to the front face of the plate body in response to the step of securing the spacer.

33. A method of installing a convertible orthopaedic implant system that interfaces with an opposed articular surface associated with a humerus, comprising:
    removing an oblong pad from a circular baseplate at a first position relative to a glenoid, wherein at least 25% of a pad area of the pad and/or a length of the pad extends superior to the baseplate relative to a superior-inferior direction of the glenoid;
    wherein the baseplate includes a plate body extending in a thickness direction between a front face and a rear face, the pad includes a pad body extending in the thickness direction between an articulating face and a bone contacting face, the plate body defines a first center of mass, the pad body defines a second center of mass, and the pad body is dimensioned such that the second center of mass is superiorly offset from the first center of mass by a first distance relative to the superior-inferior direction in the first position; and securing a glenosphere to the baseplate in situ subsequent to the step of removing the pad, the glenosphere including an articulating surface having a generally convex geometry dimensioned to interface with a humeral implant.

34. The method as recited in claim 33, further comprising:
securing a spacer between the baseplate and the glenosphere such that the glenosphere is laterally spaced apart from the plate body by a predetermined distance relative to a lateral-medial direction of the glenoid.

35. The method as recited in claim 34, wherein the spacer is dimensioned such that a rear face of the glenosphere is transversely angled relative to the front face of the plate body in response to the step of securing the spacer.

* * * * *